(12) United States Patent
Neddersen

(10) Patent No.: US 9,944,833 B2
(45) Date of Patent: Apr. 17, 2018

(54) ENERGY CURABLE BONDING RESIN

(75) Inventor: Robert Neddersen, Hartland, WI (US)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 641 days.

(21) Appl. No.: 14/238,962

(22) PCT Filed: Aug. 17, 2012

(86) PCT No.: PCT/US2012/051438
§ 371 (c)(1),
(2), (4) Date: Apr. 14, 2014

(87) PCT Pub. No.: WO2013/026024
PCT Pub. Date: Feb. 21, 2013

(65) Prior Publication Data
US 2014/0220367 A1 Aug. 7, 2014

Related U.S. Application Data

(60) Provisional application No. 61/524,962, filed on Aug. 18, 2011.

(51) Int. Cl.
| | | |
|---|---|---|
| C08F 2/46 | (2006.01) | |
| C08F 2/50 | (2006.01) | |
| C08G 61/04 | (2006.01) | |
| C09J 137/00 | (2006.01) | |
| G11B 7/256 | (2006.01) | |
| C09J 133/14 | (2006.01) | |
| G11B 7/24024 | (2013.01) | |
| G11B 7/26 | (2006.01) | |

(52) U.S. Cl.
CPC ........... C09J 137/00 (2013.01); C09J 133/14 (2013.01); G11B 7/24024 (2013.01); G11B 7/256 (2013.01); G11B 7/26 (2013.01); *C08L 2312/00* (2013.01); *Y10T 428/31678* (2015.04)

(58) Field of Classification Search
CPC ......... C09J 137/00; C09J 133/14; G11B 7/26; G11B 7/24024; G11B 7/256; C08L 2312/00; Y01T 428/31678

USPC ............ 522/38, 33, 6, 71, 189, 184, 34, 40; 520/1
See application file for complete search history.

(56) References Cited

U.S. PATENT DOCUMENTS

| | | | | |
|---|---|---|---|---|
| 6,309,794 B1* | 10/2001 | Hayashi | ................ | G11B 7/243 428/64.4 |
| 2010/0084037 A1* | 4/2010 | Ericsson | ................... | B32B 1/08 138/137 |

FOREIGN PATENT DOCUMENTS

| | | | |
|---|---|---|---|
| CN | 101930171 | * | 12/2010 |
| CN | 101930171 A | | 12/2010 |
| GB | 2437714 A | | 11/2009 |
| WO | 02/49011 A1 | | 6/2002 |
| WO | 2007/131098 | * | 11/2007 |

OTHER PUBLICATIONS

Liu, CN 101930171 Machine translation, Dec. 29, 2010.*
Chinese Office Action issued in corresponding Chinese Application No. 201280050334.9 dated Feb. 1, 2016 (with English Language Translation).
Australian Office Action issued in corresponding Australian Application No. 2012296382 dated Apr. 29, 2016.
Chinese Office Action (and partial English language translation) issued in counterpart Chinese Application No. 201280050334.9 dated Nov. 15, 2014.
International Search Report dated Nov. 22, 2012 in connection with International Application No. PCT/US2012/051438.

* cited by examiner

*Primary Examiner* — Jessica Whiteley
(74) *Attorney, Agent, or Firm* — Charles C. Achkar; Ostrolenk Faber LLP

(57) ABSTRACT

An energy curable bonding resin composition that prevents corrosion in metallic optical structures including DVDs includes at least one monomer, acrylated epoxidized soya bean oil, and a photoinitiator of among 2,4,6-trimethylbenzoyl-diphenylphosphine oxide (TPO); Phosphine oxide, phenylbis 2,4,6-trimethyl benzoyl; oligo[2-hydroxy-2-methyl-1-[4-(1-methylvinyl)phenyl]propanone]; alpha-hydroxy ketone, difunctional; or combinations thereof.

28 Claims, 1 Drawing Sheet

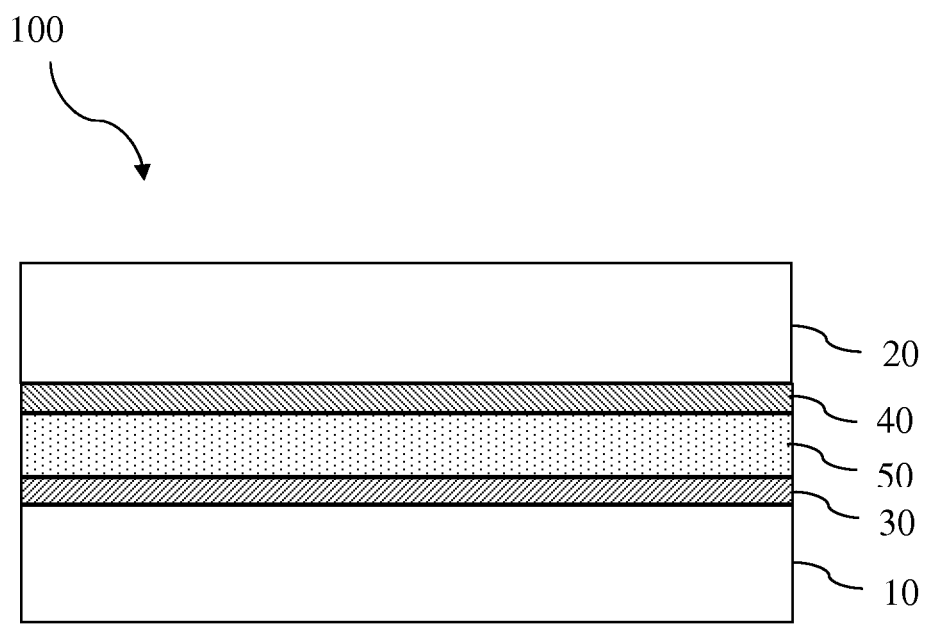

ENERGY CURABLE BONDING RESIN

CROSS REFERENCE TO RELATED APPLICATIONS

This application is a §371 National Phase application of International Application No. PCT/US2012/051438 filed on Aug. 17, 2012, which claims the benefit of U.S. Provisional Patent Application No. 61/524,963, filed on Aug. 18, 2011, each of which is hereby incorporated by reference for all purposes as if fully set forth herein.

FIELD OF THE INVENTION

The present invention relates to a bonding resin and more particularly to a bonding resin used in optical disc fabrication to increase reliability of the discs.

BACKGROUND

The need for increasing amounts of inexpensive reliable digital storage media continues to expand. Digital versatile disc (DVD) formats provide significantly more storage capacity than compact discs (CD) thus allowing more recording time with high density. To achieve the high density storage in a disc that has the same dimensions as a CD, the DVD disc construction includes two halves that are bonded together. Depending on the type of disc, the construction can vary, but typically includes two substrates each with metallic coatings.

The metallic coatings employed in DVDs may degrade over time with environmental exposure to heat, repeated temperature changes, oxygen, moisture, and other contaminants. Adding additional protective layers or changing base materials to overcome these problems can complicate manufacturing with additional equipment, expensive materials, and more process steps leading to decreased yields and increased costs.

It has been found that certain resins used in the DVD substrate bonding process may provide unsatisfactory environmental stability. For example, resins formed with constituents as outlined in Table 1 (values are amount in weight-percent of the total resin) and used to bond together two DVD substrates, one substrate with a pure silver coating and the other substrate with an aluminum coating, allow unit disc failure when subjected to a 21-day light exposure test, as detailed below. The metallic layers of test DVDs made with such resins turn black or darken to an unusable state prior to the completion of 21 days exposure, an unacceptable result. Consequently, the need exists for materials and processes that ease manufacturing, reduce costs, and increase disc life and reliability.

TABLE 1

| Material | Type | Example 8 | Example 9 | Example 10 | Example 11 |
| --- | --- | --- | --- | --- | --- |
| BPE4EODA (bisphenol A 4 mole ethoxylateddiacrylate) | Monomer | 19.0 | 19.0 | 19.0 | 24.0 |
| DPGDA (dipropyleneglycoldiacrylate) | Monomer | 28.5 | 28.5 | 28.5 | 10.0 |
| TMPEOTA (ethoxylatedtrimethylolpropanetriacrylate) | Monomer | 4.7 | 4.7 | 4.7 | 4.275 |
| 2-PEA (2-Phenoxy Ethyl Acrylate) | Monomer | — | — | — | 15.0 |
| THF (tetrahydrofurfuryl acrylate) | Monomer | 0.5 | 0.5 | 0.5 | 0.5 |
| Acrylated Expoxidized Soya Bean Oil | Oligomer | 43.275 | 43.275 | 43.275 | — |
| Aliphatic Urethane Diacrylate | Oligomer | — | — | — | 40.0 |
| TPO (2,4,6-trimethylbenzoul-diphenylphosphine oxide) | Photoinitiator | — | — | — | 2.0 |
| CPK (1-Hydroxy-Cyclohexylphenyl-Ketone) | Photoinitiator | 3.8 | — | — | 4.0 |
| BDK (Benzil Dimethyl Ketal) | Photoinitiator | — | 3.8 | — | — |
| Darocure ® 1173 (2-hydroxy-2-Methyl-1-Pheny-1-Propane-leone) | Photoinitiator | — | — | 3.8 | — |
| MEHQ (4-methoxyphenol) | UV Stabilizer | 0.1 | 0.1 | 0.1 | 0.1 |
| Disparlon ® L-1985-50 (Kusomoto Chemicals LTD) | De-gassing additive | 0.025 | 0.025 | 0.025 | 0.025 |
| Genorad ® 40 (Rahn USA) | Adhesion Promoter | .1 | .1 | .1 | .1 |
| Total |  | 100.0 | 100.0 | 100.0 | 100.0 |
| 21 Day Light Test* |  | Fail | Fail | Fail | Fail |

*Passing is less than 20% change in reflectivity after 21-day light test

SUMMARY OF THE INVENTION

Accordingly, the present invention is directed to energy curable resin that is used to bond together two substrates in fabricating DVDs that allows for reduced manufacturing costs and increased disc reliability.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an energy curable bonding resin composition to prevent corrosion in bonding metallic optical structures comprises at least one monomer; acrylated epoxidized soya bean oil; and a photoinitiator selected from among 2,4,6-trimethylbenzoyl-diphenylphosphine oxide (TPO); phosphine oxide, phenylbis 2,4,6-trimethyl benzoyl; oligo [2-hydroxy-2-methyl-1-[4-(1-methylvinyl)phenyl]propanone]; alpha-hydroxy ketone, difunctional; and combinations thereof.

In another aspect of the present invention, an assembly for use as an optical recording structure comprises a first and a second substrates; a first metallic layer deposited on the first substrate; a second metallic layer deposited on the second substrate; and a cured resin of at least one monomer; acrylated epoxidized soya bean oil; and a photoinitiator selected from among 2,4,6-trimethylbenzoyl-diphenylphosphine oxide (TPO); phosphine oxide, phenylbis 2,4,6-trimethyl benzoyl; oligo[2-hydroxy-2-methyl-1-[4-(1-methylvinyl)phenyl]propanone]; alpha-hydroxy ketone, difunctional; and combinations thereof, wherein the second substrate is bonded to the first substrate with the cured resin.

In another aspect of the present invention, an assembly for use as an optical recording structure comprises a first and a second substrates; a first metallic layer deposited on the first substrate; a second metallic layer deposited on the second substrate; and a cured resin as recited in any preceding claim, wherein the second substrate is bonded to the first substrate with the cured resin.

In another aspect of the present invention, a method of manufacturing an energy curable resin composition for use in bonding a metallized optical structure comprises the steps of: providing a monomer; dispersing an oligomer of epoxidized soya bean oil with the monomer; and dispersing a photoinitiator selected from the group consisting of 2,4,6-trimethylbenzoyl-diphenylphosphine oxide (TPO); phosphine oxide, phenylbis 2,4,6-trimethyl benzoyl; 01igo[2-hydroxy-2-methyl-1-[4-(1-methylvinyl)phenyl]propanone]; and Alpha-hydroxy ketone, difunctional with the monomer and epoxidized soya bean oil.

It is to be understood that both the foregoing general description and the following detailed description are exemplary and explanatory and are intended to provide further explanation of the invention as claimed.

BRIEF DESCRIPTION OF THE DRAWINGS

The accompanying drawing, which is included to provide a further understanding of the invention and is incorporated in and constitute a part of this specification, illustrate an embodiment of the invention and together with the description serve to explain the principles of the invention.

In the drawings:

FIG. 1 is an illustration of a cross sectional view of a DVD according to an exemplary embodiment of the invention.

DETAILED DESCRIPTION

Reference will now be made in detail to an embodiment of the present invention, an example of which is illustrated in the accompanying drawing.

FIG. 1 shows a cross-section of a DVD disc 100 in accordance with a preferred embodiment of the invention. FIG. 1 is not drawn to scale and relative thicknesses of component layers are shown for reference only.

DVD discs are typically comprised of two substrates which are metallized and bonded together with an interstitial bonding layer. The bottom substrate 10 is typically referred to in the art as L0, and the top substrate 20 typically is refereed to in the art as LI. "Bottom" and "top" are relative to the playing position where the disc is conventionally read with a laser from the bottom. Bottom substrate 10 can be typically coated with a metallic layer 30. Top substrate 20 also can be coated with a metallic layer 40. The two substrates 10 and 20 can be bonded together with a bonding resin composition 50 that is coated between the two substrates 10 and 20. The bonding resin 50 holds the two substrates 10 and 20 together while protecting the inner metallic layers 30 and 40.

The substrates 10 and 20 can include any optical quality plastic composition that allows acceptable transmission of the reading laser wavelength. Preferably, the substrates 10 and 20 comprise polycarbonate.

The metallic layer 30 on the bottom substrate 10 can be a silver alloy. The metallic layer 30 can otherwise be silver.

The metallic layer 40 on the top substrate 20 can be aluminum.

In order to reduce costs, optical disc manufacturers are considering using a pure silver coating for metallic layer 30 instead of a typically gold or silver alloy. Pure silver being greater than or equal to about 99% silver. A bottom substrate 10 coated with pure silver is commercially less expensive due to less refining, handling, and reclaim costs. Thus, there exists a need for a bonding resin composition 50 for use with a pure silver coating 30 that would allow pure silver coated substrates to have similar or improved performance when compared to the currently marketed gold or silver alloy coatings.

DVD discs manufactured with bottom substrate 10 coated with pure silver exhibit a greater than 20% reflectivity change within 2-6 days after application of current market bonding resin compositions (as exemplified in Table 1), which is an unacceptable result.

Reflectivity change=(Maximum R14H−Minimum R14H)/(Maximum R14H)×100%, where reflectivity value, R14H, is measured per Standard ECMA-267 (ISO/IEC 16448). An accepted standard for DVDs are discs that exhibit less than 20% change in disc reflectivity after 21 days exposure when placed 6 cm from a 65 W, 10,000K compact fluorescent lamp in a standard laboratory environment. Preferably, the initial disc reflectivity value R14H would be between about 18.0 and 30.0% and would remain within this range after 21 days of light exposure as described. This range however, while desirable, is not an absolute requirement and other ranges can be acceptable.

Oxidation, corrosion, and degradation of silver and silver alloys in DVD disc coatings can be caused by penetration and migration of oxygen, moisture, or other contamination through the top or bottom substrates 10 and 20 to the coating layers 30 and 40. The bonding layer 50 can also be a pathway for oxygen or moisture egress. The contamination may react with the metallic coating 30 and 40 materials to cause the layer to tarnish and discolor. The metallic coating 30 on the bottom substrate 10 needs to be sufficiently transparent so a laser irradiating the bottom of the disc 100 can read information on the top metallic layer 40. Severe degradation or discoloration of the bottom metallic coating 30 could render the disc 100 unreadable.

In the case where the top metallic layer 40 is aluminum and the bottom metallic layer 30 is pure silver, it is possible that the two metallic layers 30 and 40 react with each other to degrade one or both of the metallic layers. The silver may serve as a cathode and the aluminum an anode when the layers are separated by a dielectric material and exposed to oxygen. The silver layer may grow a dendrite through the dielectric and contact or short circuit the aluminum layer. If this occurs, corrosion and the growth of silver oxide will be accelerated. This failure mechanism can also occur with metallic layers other than pure silver and aluminum.

Alternatively, it is possible that constituents of the bonding layer may promote reaction and degradation of the contacting metallic layers. For example, it is possible that the bonding material may release certain reactive ions that corrode the silver layer. Further, it is possible materials in the bonding layer may become reactive over time if enough light energy is absorbed, and/or oxygen or moisture permeates and diffuses through the substrates.

The present application is directed to a set of novel energy curable resins that are compatible with and do not degrade adjacent metallic layers. The present invention is drawn to energy curable bonding resin compositions that can be used to bond an L0 substrate coated with a silver layer, such as a silver alloy or pure silver, to an LI substrate to form optical media discs, preferably DVD discs, which exhibit a change in reflectivity that is within an accepted standard (e.g. less that 20% change in disc reflectivity after 21 days exposure to light energy as previously described).

Preferred materials for the bonding resin compositions include a monomer in combination with an acrylated epoxidized soya bean oil oligomer and a photoinitiator. In some applications a photoinitiator can be selected from among 2,4,6-trimethylbenzoyl-diphenylphosphine oxide (TPO); phosphine oxide, phenyl-bis 2,4,6-trimethyl benzoyl (Igracure® 819-BASF); oligo[2-hydroxy-2-methyl-1-[4-(1-methyl-vinyl)phenyl]propanone] (Esacure® KIP 150—Lamberti); alpha-hydroxy ketone, difunctional (Esacure® One—Lamberti); and combinations thereof.

In some applications, the amount of the photoinitiator in the bonding resin composition is less than about 6 wt %. For example, the amount of the photoinitiator in the bonding resin composition can be from 0.05 wt % to 5 wt %, or 1 wt % to 2.5 wt % by weight of the bonding resin composition. In some applications, the amount of the photoinitiator in the bonding resin composition can be 0.05 wt %, 0.1 wt, 0.2 wt %, 0.3 wt %, 0.4 wt %, 0.5 wt %, 0.6 wt %, 0.7 wt %, 0.8 wt %, 0.9 wt %, 1.0 wt %, 1.1 wt, 1.2 wt %, 1.3 wt %, 1.4 wt %, 1.5 wt %, 1.6 wt %, 1.7 wt %, 1.8 wt %, 1.9 wt %, 2.0 wt %, 2.1 wt, 2.2 wt %, 2.3 wt %, 2.4 wt %, 2.5 wt %, 2.6 wt %, 2.7 wt %, 2.8 wt %, 2.9 wt %, 3.0 wt %, 4.1 wt, 4.2 wt %, 4.3 wt %, 4.4 wt %, 4.5 wt %, 4.6 wt %, 4.7 wt %, 4.8 wt %, 4.9 wt %, 5.0 wt %, 5.1 wt, 5.2 wt %, 5.3 wt %, 5.4 wt %, 5.5 wt %, 5.6 wt %, 5.7 wt %, 5.8 wt % or 5.9 wt %.

The bonding resin composition can contain about 40 wt % or greater acrylated epoxidized soya bean oil. In some applications, the amount of acrylated epoxidized soya bean oil in the resin composition can less than about 60 wt % of the bonding resin composition. In some applications, the amount of acrylated epoxidized soya bean oil in the resin composition can be from about 5 wt % to 10 wt %, 5 wt % to 15 wt %, or 5 wt % to 20 wt %, or 5 wt % to 25 wt %, or 5 wt % to 30 wt %, or 5 wt % to 35 wt %, or 5 wt % to 40 wt %, or 5 wt % to 45 wt %, or 5 wt % to 50 wt %, or 5 wt % to 55 wt %, or 5 wt % to 60 wt %, or 10 wt % to 20 wt %, or 10 wt % to 30 wt %, or 10 wt % to 40 wt %, or wt % to 50 wt %, or 10 wt % to 60 wt %, or 20 wt % to 30 wt %, or 20 wt % to 40 wt %, or 20 wt % to 50 wt %, or 20 wt % to 60 wt %, or 25 wt % to 35 wt %, or 25 wt % to 45 wt %, or 25 wt % to 55 wt %, or 30 wt % to 40 wt %, or 30 wt % to 50 wt %, or 30 wt % to 60 wt %, or 35 wt % to 60 wt %, or 40 wt % to 45 wt %, or 40 wt % to 50 wt %, or 40 wt % to 50 wt %, or 40 wt % to 60 wt %, or 45 wt % to 50 wt %, or 45 wt % to 55 wt %, 45 wt % to 60 wt %, or 50 wt % to 55 wt %, or 50 wt % to 60 wt %, or 55 wt % to 60 wt %, 40 wt % to 60 wt %, or 40 wt % to 50 wt %, or 50 wt % to 60 wt %, or 40 wt % to 45 wt %, or 45 wt % to 50 wt %, or 50 wt % to 55 wt %, or 55 wt % to 60 wt % by weight of the bonding resin composition.

In some applications, the bonding resin can further include an additive. The additive can be an adhesion promoter, light stabilizer, de-gassing additive, flow promoter, defoamer, antioxidant, UV stabilizer, surfactant, dispersants, plasticizer, rheological additive, wax, silicone, and combinations thereof. In some application a UV stabilizer may be 4-methoxyphenol (MEHQ). In some applications, a de-gassing additive can include Disparlon® L-185-50 from Kusomoto Chemicals, LTD. In some applications, an adhesion promoter can be Genorad® 40 from Rahn USA Corp.

In some applications, the amount of the additive in the bonding resin composition is about 5 wt %, or less than about 5 wt %. For example, the amount of the additive in the bonding resin composition can be from 0.05 wt % to 5 wt %, or 1 wt % to 2.5 wt % by weight of the bonding resin composition. In some applications, the amount of the additive in the bonding resin composition can be 0.05 wt %, 0.1 wt, 0.2 wt %, 0.3 wt %, 0.4 wt %, 0.5 wt %, 0.6 wt %, 0.7 wt %, 0.8 wt %, 0.9 wt %, 1.0 wt %, 1.1 wt, 1.2 wt %, 1.3 wt %, 1.4 wt %, 1.5 wt %, 1.6 wt %, 1.7 wt %, 1.8 wt %, 1.9 wt %, 2.0 wt %, 2.1 wt, 2.2 wt %, 2.3 wt %, 2.4 wt %, 2.5 wt %, 2.6 wt %, 2.7 wt %, 2.8 wt %, 2.9 wt %, 3.0 wt %, 4.1 wt %, 4.2 wt %, 4.3 wt %, 4.4 wt %, 4.5 wt %, 4.6 wt %, 4.7 wt %, 4.8 wt %, 4.9 wt % or 5.0 wt %

The bonding resin includes at least one monomer. As used herein, "monomer" refers to a material having a viscosity less than that of an oligomer and a relatively low molecular weight (i.e., having a molecular weight less than about 750 g/mole) and containing one or more polymerizable groups, which are capable of polymerizing and combining with other monomers or oligomers to form other oligomers or polymers. A monomer can have a viscosity of 150 cP or less measured at 25° C. at a shear rate of about 4 to 20 sec"1 with a Brookfield viscometer. A monomer can be used to modulate the viscosity of an oligomer.

In some applications, the monomer can be a mono-, di-, tri-, or multifunctional acrylate. Exemplary monomers include bisphenol A 4 mole ethoxylated diacrylate (BPE4EODA), dipropylene glycol diacrylate (DPGDA), ethoxylated trimethylolpanetriacrylate (TMPEOTA), tetrahydrofurfuryl (THF) acrylate, tripropylene glycol diacrylate (TPGDA), neopentylglycol diacrylate (NPGDA), isobornyl acrylate (IBOA), 1,6-hexanediol diacrylate (HDD A), ethoxyethoxyethyl acrylate (EOEOA), 2-phenoxy ethyl acrylate (2-PEA), and combinations thereof. In some applications, the amount of the monomer in the bonding resin composition can be 30 wt % to 60 wt % by weight of the bonding resin composition. In some applications, the amount of the monomer in the bonding resin composition can be 30 wt % to 35 wt %, 30 wt % to 40 wt %, or 30 wt % to 45 wt %, or 30 wt % to 50 wt %, or wt % to 55 wt %, 35 wt % to 40 wt %, or 35 wt % to 45 wt %, or 35 wt % to 50 wt %, or 35 wt % to 55 wt %, or 35 wt % to 60 wt %, or 40 wt % to 45 wt %, or 40 wt % to 50 wt %, or 40 wt % to 50 wt %, or 40 wt % to 60 wt %, or 45 wt % to 50 wt %, or 45 wt % to 55 wt %, 45 wt % to 60 wt %, or 50 wt % to 55 wt %, or 50 wt % to 60 wt %, or 55 wt % to 60 by weight of the bonding resin composition.

In some applications the resin can further include an additional oligomer. As used herein, "oligomer" refers to a material having a viscosity greater than that of a monomer and a relatively intermediate molecular weight (i.e., having a molecular weight greater than about 750 g/mole but generally less than 100,000 g/mole) having one or more radiation polymerizable groups, which are capable of polymerizing and combining with monomers or oligomers to form other oligomers or polymers. The number average molecular weight of the oligomer is not particularly limited and can be, for example, between about 750-10,000 g/mole. Molecular weight can be selected to achieve the desired viscosity, modulus, solvent resistance and other important properties. Oligomer molecular weight and its distribution can be determined by gel permeation chromatography.

The additional oligomer can be selected from among urethane acrylates, polyester acrylates, epoxy acrylates, or combinations thereof.

In some applications, the amount of the additional oligomer in the bonding resin composition can be less than about 25 wt % of the total amount of oligomer. In some applications, the amount of the additional oligomer in the bonding resin composition can be or 1 wt % to 5 wt %, 1 wt % to 10 wt %, or 1 wt % to 15 wt %, or 1 wt % to 20 wt %, or 5 wt % to 10 wt %, 10 wt % to 15 wt %, or 15 wt % to 20 wt %, or 20 wt % to 25 wt %, or 5 wt % to 15 wt %, or 5 wt % to 20 wt %, or 5 wt % to 25 wt %, or 10 wt % to 15 wt %, or 10 wt % to 20 wt %, or 10 wt % to 25 wt %, or 20 wt % to 25 wt % by weight of the bonding resin composition.

In some applications the resin can further include a suitable colorant. The colorant can include organic and inorganic pigments and dyes.

EXAMPLES

The following bonding resin composition examples, summarized in Table 2, are provided for illustrative purposes and are not to be construed as limiting the invention. The amount of each constituent listed is by wt % of the total bonding resin. The constituent materials were disposed in a suitable vessel and mixed together at an elevated temperature, about 60° C., to facilitate mixing. The resulting bonding resin composition was then allowed to cool to room temperature prior to use.

Each of the example resins was prepared and used to manufacture sample DVD discs with aluminum coated L1 polycarbonate substrates and L0 pure silver coated polycarbonate substrates. The L0 and L1 substrates were bonded together with a spin coated energy curable bonding resin, as exemplified, and optically tested. DVD discs made using the Examples 1-6 bonding resin compositions exhibited less than 12% change in disc reflectivity after 28 days of light exposure under the conditions previously described when measuring the R14H value in an AudioDev CATS DVD disc tester in accordance with the ECMA-267 (ISO/IEC 16448) standard technique.

Example 1

An exemplary resin composition as described was prepared. A resin composition was prepared by mixing the following: 19 wt % bisphenol A 4 mole ethoxylated diacrylate (BPE4EODA), 28.5 wt % dipropylene glycol diacrylate (DPGDA), 4.7 wt % ethoxylated trimethylolpanetriacrylate (TMPEOTA), 0.5 wt % tetrahydrofurfuryl (THF) acrylate; 44.225 wt % epoxidized soya bean oil; 2.85 wt % photoinitiator 2,4,6-trimethylbenzoyl-diphenylphosphine oxide (TPO); 0.1 wt % UV stabilizer 4-methoxyphenol (MEHQ); 0.025 wt % de-gassing additive (Disparlon® L-1985-50); and 0.1 wt % adhesion promoter (Genorad® 40). The components were mixed in a vessel until homogeneous.

Example 2

An exemplary resin composition as described was prepared. A resin composition was prepared by mixing the following: 19 wt % bisphenol A 4 mole ethoxylated diacrylate (BPE4EODA), 28.5 wt % dipropylene glycol diacrylate (DPGDA), 4.7 wt % ethoxylated trimethylolpanetriacrylate (TMPEOTA), 0.5 wt % tetrahydrofurfuryl (THF) acrylate; 43.275 wt % epoxidized soya bean oil; 3.8 wt % photoinitiator 2,4,6-trimethylbenzoyl-diphenylphosphine oxide (TPO); 0.1 wt % UV stabilizer 4-methoxyphenol (MEHQ); 0.025 wt % de-gassing additive (Disparlon® L-1985-50); and 0.1 wt % adhesion promoter (Genorad® 40). The components were mixed in a vessel until homogeneous.

Example 3

An exemplary resin composition as described was prepared. A resin composition was prepared by mixing the following: 19 wt % bisphenol A 4 mole ethoxylated diacrylate (BPE4EODA), 28.5 wt % dipropylene glycol diacrylate (DPGDA), 4.7 wt % ethoxylated trimethylolpanetriacrylate (TMPEOTA), 0.5 wt % tetrahydrofurfuryl (THF) acrylate; 43.275 wt % epoxidized soya bean oil; 3.8 wt % photoinitiator oligo[2-hydroxy-2-methyl-1-[4-(1-methylvinyl)phenyl]propanone] (Esacure® KIP 150—Lamberti); 0.1 wt % UV stabilizer 4-methoxyphenol (MEHQ); 0.025 wt % de-gassing additive (Disparlon® L-1985-50); and 0.1 wt % adhesion promoter (Genorad® 40). The components were mixed in a vessel until homogeneous.

Example 4

An exemplary resin composition as described was prepared. A resin composition was prepared by mixing the following: 19 wt % bisphenol A 4 mole ethoxylated diacrylate (BPE4EODA), 28.5 wt % dipropylene glycol diacrylate (DPGDA), 4.7 wt % ethoxylated trimethylolpanetriacrylate (TMPEOTA), 0.5 wt % tetrahydrofurfuryl (THF) acrylate; 43.275 wt % epoxidized soya bean oil; 3.8 wt % photoinitiator alpha-hydroxyketone, difunctional (Esacure® One—Lamberti); 0.1 wt % UV stabilizer 4-methoxyphenol (MEHQ); 0.025 wt % degassing additive (Disparlon® L-1985-50); and 0.1 wt % adhesion promoter (Genorad® 40). The components were mixed in a vessel until homogeneous.

Example 5

An exemplary resin composition as described was prepared. A resin composition was prepared by mixing the following: 19 wt % bisphenol A 4 mole ethoxylated diacrylate (BPE4EODA), 28.5 wt % dipropylene glycol diacrylate (DPGDA), 4.7 wt % ethoxylated trimethylolpanetriacrylate (TMPEOTA), 0.5 wt % tetrahydrofurfuryl (THF) acrylate; 43.275 wt % epoxidized soya bean oil; 3.8 wt % photoinitiator phosphine oxide, phenylbis 2,4,6-trimethyl benzoyl (Igracure® 819-BASF); 0.1 wt % UV stabilizer 4-methoxyphenol (MEHQ); 0.025 wt % de-gassing additive (Disparlon® L-1985-50); and 0.1 wt % adhesion promoter (Genorad® 40). The components were mixed in a vessel until homogeneous.

Example 6

An exemplary resin composition as described was prepared. A resin composition was prepared by mixing the following: 19 wt % bisphenol A 4 mole ethoxylated diacrylate (BPE4EODA), 28.5 wt % dipropylene glycol diacrylate (DPGDA), 4.7 wt % ethoxylated trimethylolpanetriacrylate (TMPEOTA), 0.5 wt % tetrahydrofurfuryl (THF) acrylate; 43.275 wt % epoxidized soya bean oil; 3.358 wt % photoinitiators 2,4,6-trimethylbenzoyl-diphenylphosphine oxide (TPO), 0.45 wt % alpha-hydroxyketone, difunctional (Esacure® One—Lamberti); 0.1 wt % UV stabilizer 4-methoxyphenol (MEHQ); 0.025 wt % de-gassing additive (Disparlon® L-1985-50); and 0.1 wt % adhesion promoter (Genorad® 40). The components were mixed in a vessel until homogeneous.

Example 7

An exemplary resin composition as described was prepared. A resin composition was prepared by mixing the following: 13.0 wt % dipropylene glycol diacrylate (DPGDA), 2.5 wt % ethoxylated trimethylolpanetriacrylate (TMPEOTA), 23.0 wt % 2-phenoxy ethyl acrylate (2-PEA), 0.5 wt % tetrahydrofurfuryl (THF) acylate; 56.1 wt % epoxidized soya bean oil; 4.475 wt % photoinitiator 2,4,6-trimethylbenzoyl-diphenylphosphine oxide (TPO); 0.2 wt % UV stabilizer 4-methoxyphenol (MEHQ); 0.025 wt % de-gassing additive (Disparlon® L-1985-50); and 0.2 wt % adhesion promoter (Genorad® 40). The components were mixed in a vessel until homogeneous.

TABLE 2

| Material | Type | Example 1 | Example 2 | Example 3 | Example 5 | Example 5 | Example 6 | Example 7 |
|---|---|---|---|---|---|---|---|---|
| BPE4EODA (bisphenol A 4 mole ethoxylateddiacrylate) | Monomer | 19.0 | 19.0 | 19.0 | 19.0 | 19.0 | 19.0 | — |
| DPGDA (dipropyleneglycoldiacrylate) | Monomer | 28.5 | 28.5 | 28.5 | 28.5 | 28.5 | 28.5 | 13.0 |
| TMPEOTA (ethoxylatedtrimethylolpropanetriacrylate) | Monomer | 4.7 | 4.7 | 4.7 | 4.7 | 4.7 | 4.7 | 2.5 |
| 2-PEA (2-Phenoxy Ethyl Acrylate) | Monomer | — | — | — | — | — | — | 23.0 |
| THF (tetrahydrofurfuryl acrylate) | Monomer | 0.5 | 0.5 | 0.5 | 0.5 | 0.5 | 0.5 | 0.5 |
| Acrylated Expoxidized Soya Bean Oil | Oligomer | 44.225 | 43.275 | 43.275 | 43.275 | 43.275 | 43.275 | 56.1 |
| TPO (2,4,6-trimethylbenzoul-diphenylphosphine oxide) | Photoinitiator | 2.85 | 3.8 | — | — | — | 3.35 | 4.475 |
| Esacure ® KIP 150 (Lamberti) | Photoinitiator | — | — | 3.8 | — | — | — | — |
| Esacure ® One (Lamberti) | Photoinitiator | — | — | — | 3.8 | — | 0.45 | — |
| Irgacure ® 819 (BASF) | Photoinitiator | — | — | — | — | 3.8 | — | — |
| MEHQ (4-methoxyphenol) | UV Stabilizer | 0.1 | 0.1 | 0.1 | 0.1 | 0.1 | 0.1 | 0.2 |
| Disparlon ® L-1985-50 (Kusomoto Chemicals LTD) | De-gassing additive | 0.025 | 0.025 | 0.025 | 0.025 | 0.025 | 0.025 | 0.025 |
| Genorad ® 40 (Rahn USA) | Adhesion Promoter | 0.1 | 0.1 | 0.1 | 0.1 | 0.1 | 0.1 | 0.2 |
| Total | | 100.0 | 100.0 | 100.0 | 100.0 | 100.0 | 100.0 | 100.0 |
| 21 Day Light Test* | | Pass | Pass | Pass | Pass | Pass | Pass | Pass |

*Passing is less than 20% change in reflectivity after 21-day light test

A method of assembling a DVD is now described. Suitable substrates are provided that can be metallized and bonded together to form a DVD.

Metallization can be accomplished using various reflective materials. Metal materials could comprise gold, silver, platinum, aluminum, and alloys thereof. The metallic layers can be deposited on the substrates using sputtering, evaporation, electroplating, or any other technique known in the art.

A liquid energy curable bonding resin 50, as exemplified above, can be disposed between the metallized substrates 10 and 20. The bonding resin 50 can be coated on any substrate to a desired thickness by spraying, brushing, dipping, screening, spin coating, or any other technique known in the art.

After coating the liquid bonding resin 50, the substrates 10 and 20 are oriented together such that the bonding resin is disposed between the two substrates. After orienting the substrates together, the energy curable bonding resin 50 can be cured.

The process of curing the energy curable bonding resin 50 can be accomplished with actinic radiation. "Energy curable" is meant to encompass all forms of actinic radiation. The actinic radiation can include ultra-violet (UV). The actinic radiation can also include infrared (IR). The actinic radiation can further include an electron beam.

After bonding the two substrates 10 and 20 together by curing the energy curable bonding resin composition, the reflectivity performance of the disc can be tested. A change in the $R_{14H}$ value as measured per Standard ECMA—267 (reproduced below) is measured after 21 days of light exposure in the conditions previously described where the reflectivity change=(Maximum $R_{14H}$—Minimum $R_{14H}$)/(Maximum $R_{14H}$)×100%. ECMA, Standardizing Information and Communication System, 267 Standard ECMA (3rd ed. April 2001).

Reproduced below is Annex D with related tables and figures from ECMA Standard-267 describing the Reflectivity $R_{14H}$ test method. Also included is Section 13 of the ECMA Standard—267 describing parameter $I_{14H}$ used in the $R_{14H}$ calculation.

Measurement of light reflectance

D.1 Calibration method

A good reference disk shall be chosen, for instance 0,6 mm glass disk with a golden reflective mirror. This reference disk shall be measured by a parallel beam as shown in figure D.1

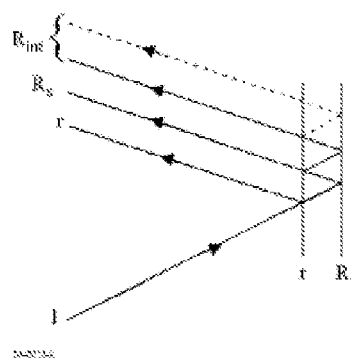

Figure D.1 – Reflectance calibration

In this figure the following applies.

I = incident beam r = reflectance of the entrance surface $R_s$ = main reflectance of the recorded layer $R_{int}$ = other reflectances of the entrance surface and of the recorded layer $R_{//}$ = measured value, using the arrangement of figure D.1

$R_{//} = r + R_s + R_{int}$ $r = ((n-1)/(n+1))^2$ where $n$ is the refraction index of the substrate $R_s = R_{//} - r - R_{int}$ $R_s = [(1-r)^2 \times (R_{//} - r)] / [1 - r \times (2 - R_{//})]$ The reference disk shall be measured on a reference drive and $I_{mirror}$ measured by the focused beam is equated to $R_s$ as determined above.

Now the arrangement is calibrated and the focused reflectivity is a linear function of the reflectivity of the recorded layer, independently from the reflectivity of the entrance surface.

0.2 Measuring method

The measuring method comprises the following steps:

a) Measure the reflective light power $D_s$ from the reference disk with calibrated reflectivity $R_s$.

b) Measure $I_{14H}$ in the Information Zone of the disk (see 13.2).

c) Calculate the reflectivity as follows:

$$R_{14H} = R_s \times \frac{I_{14H}}{D_s}$$

Section 3 - Operational Signals

13  High frequency signals (HF)

The HF signal is obtained by summing the currents of the four elements of the photo detector. These currents are modulated by diffraction of the light beam at the pits representing the information on the recorded layer. Measurements, except for jitter, are executed to HF before equalizing.

13.1  Modulated amplitude

The modulated amplitude $I_{14}$ is the peak-to-peak value generated by the largest pit and land length (figure 11).

The peak value $I_{14H}$ shall be the peak value corresponding to the HF signal before high-pass filtering.

The peak-to-peak value of the shortest pit and land length shall be $I_3$.

The 0 Level is the signal level obtained from the measuring device when no disk is inserted.

These parameters shall meet the following requirements.

$I_{14} / I_{14H}$ = 0,60 min.

$I_3 / I_{14}$ = 0,15 min. for Types A and B $I_3 / I_{14}$ = 0,20 min. for Types C and D The maximum value of $(I_{14Hmax} - I_{14Hmin}) / I_{14Hmax}$ shall be as specified by table 2.

Table 2 - Maximum value of $(I_{14Hmax} - I_{14Hmin}) / I_{14Hmax}$

|  | Within one recorded side of a disk | Within one revolution |
|---|---|---|
| PUH with PBS | 0,33 | 0,15 |
| PUH without PBS with circular polarization | 0,20 | 0,10 |

13.2  Signal asymmetry

The signal asymmetry shall meet the following requirement, see figure 11.

$$-0,05 \leq [ (I_{14H} + I_{14L})/2 - (I_{3H} + I_{3L})/2 ] / I_{14} \leq 0,15$$

where

- $(I_{14H} + I_{14L}) / 2$ is the centre level of $I_{14}$
- $(I_{3H} + I_{3L}) / 2$ is the centre level of $I_3$.

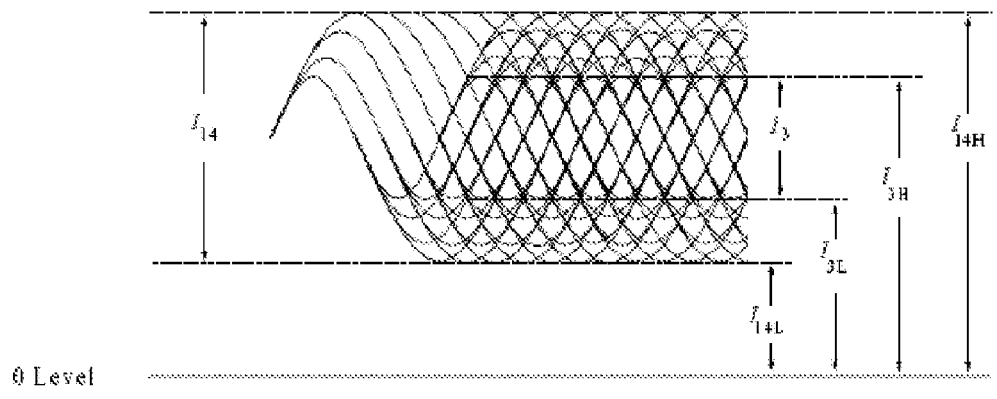
Figure 11 - Modulated amplitude

What is claimed is:

1. An energy curable bonding resin composition to prevent corrosion in bonding metallic optical structures comprising:
   at least one monomer;
   acrylated epoxidized soya bean oil; and
   a photoinitiator selected from among 2,4,6-trimethylbenzoyl-diphenylphosphine oxide (TPO); phosphine oxide, phenylbis 2,4,6-trimethyl benzoyl; oligo[2-hydroxy-2-methyl-1-[4-(1-methylvinyl)phenyl]propanone]; difunctional alpha-hydroxy ketone, and combinations thereof;
   wherein the amount of epoxidized soya bean oil is less than 60% by weight of the resin composition; and wherein at least one photoinitiator is a difunctional alpha-hydroxy ketone; and wherein the bonding resin is an adhesive for bonding the metallic surface of a first optical quality substrate to the metallic surface of a second optical quality substrate; and wherein the bonding resin prevents corrosion of the metallic surfaces of the optical substrates.

2. The resin of claim 1, further comprising an additive selected from among an adhesion promoter, light stabilizer, de-gassing additive, flow promoter, defoamer, antioxidant, UV stabilizer, surfactant, dispersants, plasticizer, rheological additive, wax, and silicone.

3. The resin of claim 1, wherein the monomer is selected from among bisphenol A 4 mole ethoxylated diacrylate (BPE4EODA), dipropylene glycol diacrylate (DPGDA), ethoxylated trimethylolpropane ethoxy triacrylate (TMPEOTA), tetrahydrofurfuryl (THF) acrylate, tripropylene glycol diacrylate (TPGDA), neopentylglycol diacrylate (NPGDA), isobornyl acrylate (IBOA), 1,6-hexanediol diacrylate (HDD A), ethoxyethoxyethyl acrylate (EOEOA), 2-phenoxy ethyl acrylate (2-PEA), and combinations thereof.

4. The resin of claim 1, further comprising an oligomer selected from among urethane acrylates, polyester acrylates, and epoxy acrylates.

5. The resin of claim 1, further comprising a colorant including an organic pigment, an inorganic pigment, a dye, or a combination thereof.

6. The resin of claim 1, wherein the amount of the photoinitiator is less than about 6% by weight of the resin composition.

7. The resin of claim 2, wherein the amount of the additive is less than about 5% by weight of the resin composition.

8. The resin of claim 4, wherein the amount of the additional oligomer is less than about 25% of the total oligomer content by weight.

9. An assembly for use as an optical recording structure comprising:
   a first and a second substrates;
   a first metallic layer deposited on the first substrate;
   a second metallic layer deposited on the second substrate; and
   a cured resin as recited in claim 1, wherein the second substrate is bonded to the first substrate with the cured resin.

10. An assembly as in claim 9, wherein the first and the second substrates comprise polycarbonate.

11. An assembly as in claim 9, wherein the first metallic layer comprises silver.

12. An assembly as in claim 9, wherein the first metallic layer comprises silver alloy.

13. An assembly as in claim 9, wherein the second metallic layer comprises aluminum.

14. An assembly as in claim 9, wherein the optical recording structure exhibits a change in reflectivity after 21 days exposure when placed 6 cm from a 65 W, 10,000K compact fluorescent lamp in a standard laboratory environment that is less than 20% when measuring the $R_{14H}$ value in accordance with Standard ECMA-267 (ISO/IEC 16448),
   wherein the change in reflectivity equals (Maximum $R_{14H}$–Minimum $R_{14H}$)/(Maximum $R_{14H}$) 100%.

15. A method of making a reliable optical digital recording disc comprising:
   providing a first and a second polycarbonate substrates;
   depositing a first metallic layer on the first substrate;
   depositing a second metallic layer on the second substrate;
   bonding the first substrate to the second substrate with an energy curable resin of claim 1; and
   curing the resin.

16. The method of claim 15, wherein the first metallic layer comprises silver.

17. The method of claim 15, wherein the first metallic layer comprises a silver alloy.

18. The method of claim 15, wherein the second metallic layer comprises aluminum.

19. The method of claim 15, wherein the curing is performed with actinic radiation.

20. The method of claim 15, wherein the curing is performed with ultraviolet radiation.

21. The method of claim 15, wherein the curing is performed with an electron beam.

22. The method of claim 15, wherein the curing is performed with infrared radiation.

23. The method of claim 15, further comprising, measuring a $R_{14H}$ value of the optical disc in accordance with Standard ECMA-267, wherein change in reflectivity after 21 days exposure when placed 6 cm from a 65 W, 10,000K compact fluorescent lamp in a standard laboratory environment that is less than 20% when measuring the $R_{14H}$ value in accordance with Standard ECMA-267 (ISO/IEC 16448), is indicative of good perfornlance,
   wherein the change in reflectivity equals (Maximum $R_{14H}$–Minimum $R_{14H}$)/(Maximum $R_{14H}$)×100%.

24. A method of manufacturing an energy curable resin composition for use in bonding a metallized optical structure comprising the steps of:
   providing a monomer:
   dispersing an oligomer of epoxidized soya bean oil with the monomer; and
   dispersing a photoinitiator selected from the group consisting of 2,4,6-trimethylbenzoyl-diphenylphosphine oxide (TPO); phosphine oxide, phenylbis 2,4,6-trimethyl benzoyl; 0ligo[2-hydroxy-2-methyl-1-[4-(1-ethylvinyl)phenyl]propanone], and Alpha-hydroxy ketone, difunctional with the monomer and epoxidized soya bean oil;
   wherein the amount of epoxidized soya bean oil is less than 60% by weight of the resin composition; and wherein at least one photoinitiator is a difunctional alpha-hydroxy ketone; and wherein the bonding resin is an adhesive for bonding the metallic surface of the first optical quality substrate to the metallic surface of a second optical quality substrate; and wherein the bonding resin prevents corrosion of the metallic surfaces of the optical substrates.

25. The method of claim 24, further comprising, dispersing an additive with the monomer, expoxidised soya bean oil, and the photoinitiator.

26. The method of claim 24, further comprising dispersing an oligomer among urethane acrylates, polyester acrylates, and epoxy acrylates.

27. The method of claim 24, further comprising dispersing a colorant into the mixture, wherein the colorant comprises an organic pigment, an inorganic pigment, a dye, or a combination thereof.

28. The method of claim 24, wherein the monomer is selected from among bisphenol A 4 mole ethoxylated diacrylate (BPE4EODA), dipropylene glycol diacrylate (DPGDA), ethoxylated trimethylolpropane triacrylate (TMPEOTA), tetrahydrofurfuryl (THF) acrylate, tripropylene glycol diacrylate (TPGDA), neopentylglycol diacrylate (NPGDA), isobornyl acrylate (IBOA), 1,6-hexanediol diacrylate (HDDA), ethoxyethoxyethyl acrylate (EOEOA), 2-phenoxy ethyl acrylate (2-PEA), and combinations thereof.

* * * * *